UNITED STATES PATENT OFFICE.

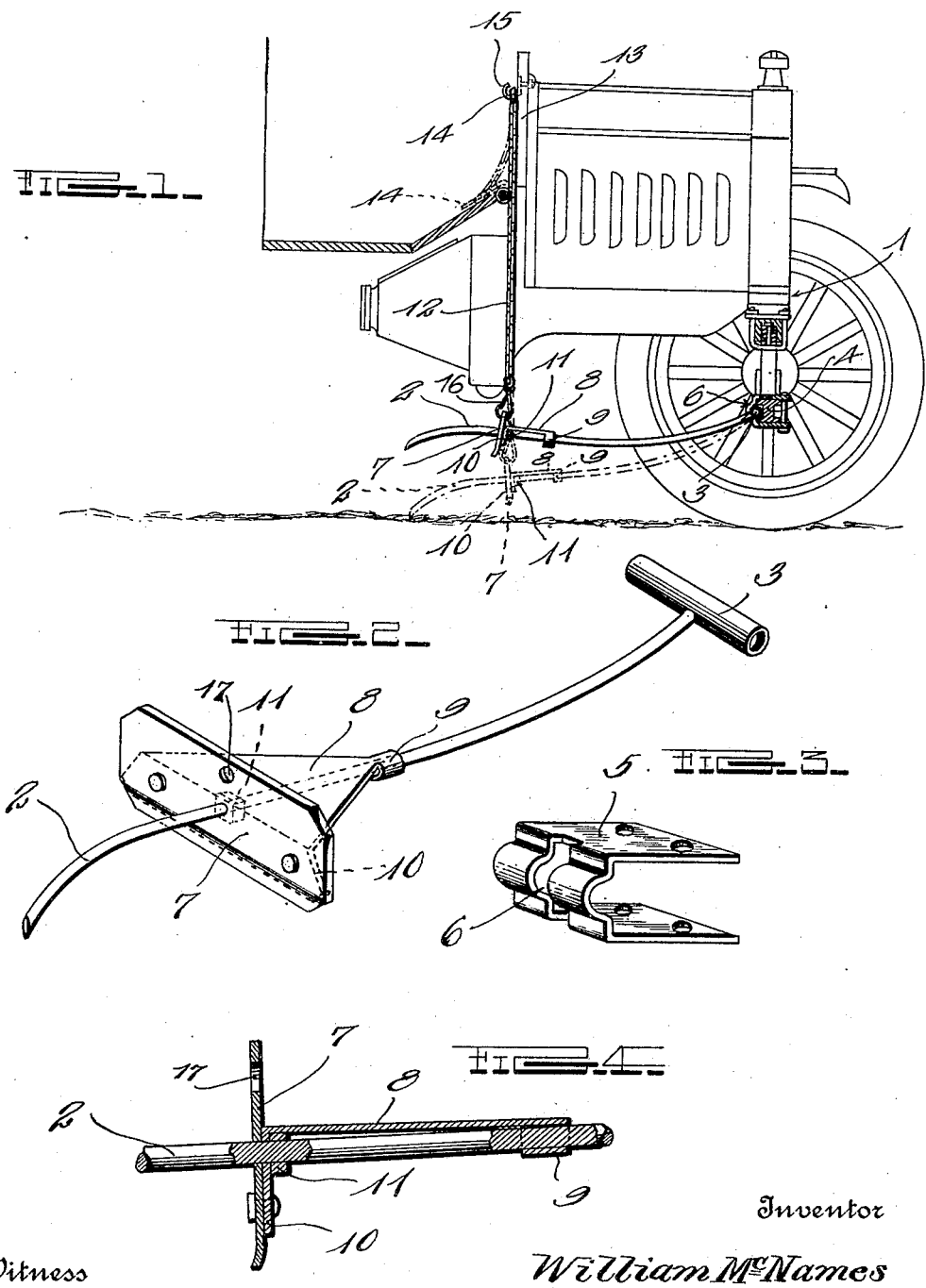

WILLIAM McNAMES, OF ABERDEEN, SOUTH DAKOTA.

AUTOMOBILE-CHECK.

1,398,440.  Specification of Letters Patent.  Patented Nov. 29, 1921.

Application filed December 16, 1920. Serial No. 431,208.

*To all whom it may concern:*

Be it known that I, WILLIAM McNAMES, a citizen of the United States, residing at Aberdeen, in the county of Brown and State of South Dakota, have invented certain new and useful Improvements in Automobile-Checks; and I do declare the following to be a full, clear, and exact description of the invention, such as will enable others skilled in the art to which it appertains to make and use the same.

This invention relates to an improved check for use upon an automobile or similar vehicle and the main object of the invention is to provide a check which may be connected with one of the axles of the vehicle and will serve to prevent the automobile from moving back downhill in case the motor should become inoperative while the automobile is traveling up hill.

Another object of the invention is to so construct this device that it may be released and permitted to move to the operative position in which position it will permit the automobile to move forwardly and will serve very effectively to prevent it from moving rearwardly.

Another object of the invention is to so construct the device that an improved type of guard plate may be mounted upon the ground engaging bar, the guard plate serving to strengthen the bar and further providing means for connection with a chain used to releasably hold the device in an inoperative position.

Another object of the invention is to so construct this device that it will be very simple in construction and comprise a comparatively few number of parts, the device being further so constructed that it may be readily connected with a conventional construction of automobile thus permitting it to be connected with an automobile already in use.

This invention is illustrated in the accompanying drawings, wherein:

Figure 1 is a view partially in section and side elevation showing the device in use.

Fig. 2 is a perspective view of the device.

Fig. 3 is a perspective view of the axle-engaging clamp.

Fig. 4 is a fragmentary sectional view of the intermediate portion of the bar.

This improved device is positioned beneath the body 1 of the automobile and is provided with a ground engaging arm or bar 2 which is curved longitudinally and provided with a sharpened end so that the free end of the bar may bite into a relatively hard pavement and thus prevent the automobile from moving rearwardly in case the engine should stop running while an automobile is running up a hill. It should be further noted that by having the bar 2 curved as shown, this bar is given additional strength and prevented from breaking or doubling back upon itself when in use. The forward end portion of this bar is provided with a head 3 which is in the form of a T-head and fits against the axle 4. A clamp 5 is secured about the axle 4 and is provided with a slot 6 through which the bar 2 passes, the clamp forming a bearing to loosely hold the bar close to the rear face of the axle and permit of easy movement into and out of an operative position. It will thus be seen that this device can be readily connected either with the forward axle or the rear axle of an automobile. A plate 7 positioned upon this bar 2 in spaced relation to the free end thereof is braced by a rearwardly extending fin 8 which tapers forwardly from the plate 7 and is provided at its forward end with a collar 9 secured about the bar 2. A flange 10 extends downwardly from this fin 8 and is riveted to the plate 7 so that the fin will be firmly connected with the plate and a block 11 through which the bar 2 passes is firmly secured to the underface of the fin at its junction with the flange, thus holding the fin and plate in firm engagement with the bar. This plate and fin in addition to strengthening the bar and preventing any tendency to bend provides a blade for engaging a muddy road and further provides a plate with which the suspending chain or cable 12 may be connected. This chain serves as means for supporting the bar in an inoperative position and is carried upwardly from the plate and through the flooring of the vehicle in front of the dashboard 13. A ring 14 is carried by the chain 12 above the flooring of the vehicle and a hook 15 is provided at the point upon the dashboard where the upper end of the chain is secured so that when the chain is drawn upwardly to raise the bar, the ring 14 may be placed upon the hook and the bar suspended in a raised position.

When this device is in use, it is connected with the axle and the chain is passed through an opening in the flooring of the automobile and the hook 16 at its lower end is connected with the plate 7, by being passed through the opening 17 in the upper portion of the plate. The upper end of the chain is secured to the dashboard by a bolt or other similar fastener which in addition to securing the chain also serves as securing means for the hook 15. The ring will be placed upon the hook and the bar will be held in a raised or inoperative position until it is desired to make use of the device. When starting up a hill, it is simply necessary to release the ring from the hook and the bar will swing down to a lowered position with its free end engaging the ground and the chain assuming approximately the position indicated by dotted lines in Fig. 1. The ring 14 will prevent the chain from passing through the opening in the floor beyond a desired amount and will at all times be positioned above the floor where it can be easily reached. The bar will thus drag upon the ground and unless the machine should come to a stop, it will not interfere with the movement of the machine. If however the engine should come to a stop and the machine starts to drift backward down the hill, the sharpened free end of the bar will dig into the roadway and the automobile thus be brought to a stop. The automobile will be held against rearward movement but will not interfere with forward movement when the motor is again started and the machine moves forwardly again. As soon as the top of the hill has been passed, the chain may be drawn upwardly and this will raise the bar to the inoperative position. The ring will then again be placed upon the hook 15 and the bar will be retained in the raised position until it is desired to use the bar again. When desired, this device can be very readily removed and transferred to a different machine. It should be noted that when put in place, the clamp holds the head of the bar in engagement with the rear face of the axle and therefore the strain exerted when the device is in use will be brought against the axle and there will be no danger of the clamp being broken.

What is claimed is:

1. A vehicle check comprising a bar having one end sharpened, a pivot head at the second end of said bar, means for loosely supporting the head of said bar in contacting relation with the rear face of an axle, a plate having an opening receiving said bar, a fin carried by said plate and resting upon said bar and having one end connected with said bar, and means connected with said plate for releasably holding the bar in an inoperative position.

2. A vehicle check comprising a bar having one end sharpened, a pivot head at the second end of said bar, an axle engaging clamp engaging the head to pivotally mount said bar with the head of the bar engaging the rear face of the axle, and means for releasably holding the bar drawn up to an inoperative position.

In testimony whereof I have hereunto set my hand.

WILLIAM McNAMES.